Figure 1:
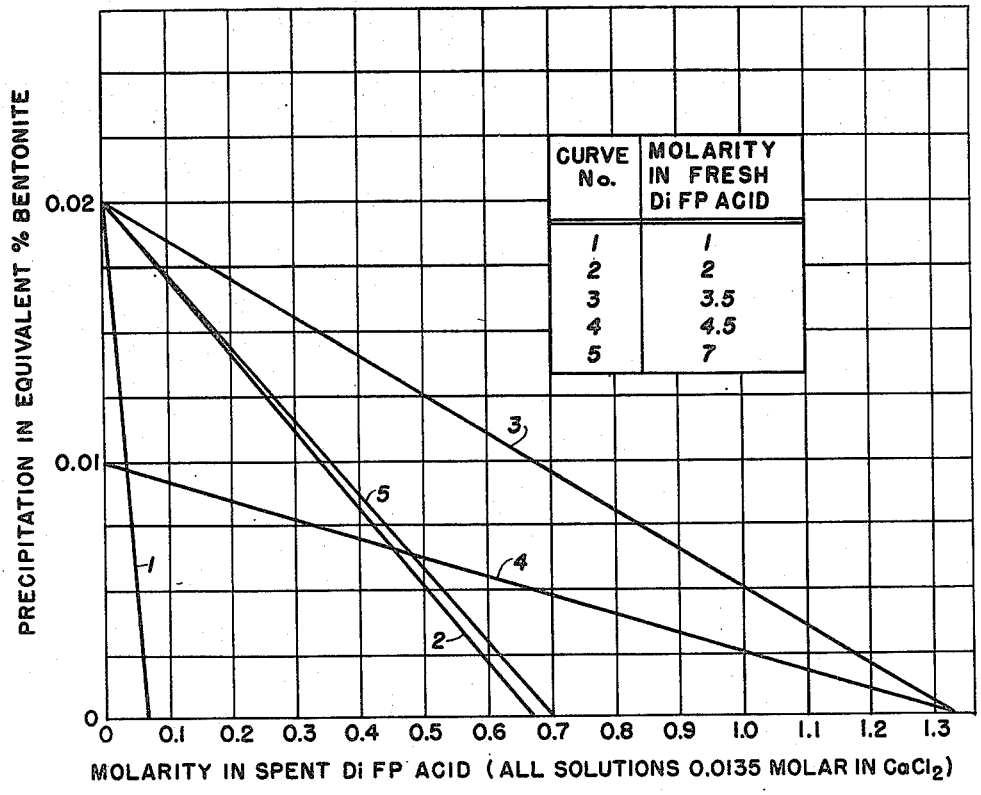

FIG. I

EFFECT OF SPENT FLUOPHOSPHORIC ACID ON THE FORMATION OF
PRECIPITATES IN AQUEOUS FRESH FLUOPHOSPHORIC ACID—
$CaCl_2$ MIXTURES

MOLARITY IN SPENT DIFLUOPHOSPHORIC ACID REQUIRED TO PREVENT INCIPIENT PRECIPITATION OF $CaF_2$ vs MOLARITY IN FRESH DIFLUOPHOSPHORIC ACID

INVENTOR.
DONALD C. BOND
BY  ROY H. LORENZ

ATTORNEY

Patented Sept. 28, 1954

2,690,428

UNITED STATES PATENT OFFICE 2,690,428

ACIDIZING WELLS

Donald C. Bond, Crystal Lake, and Roy H. Lorenz, Elmhurst, Ill., assignors to The Pure Oil Company, Chicago, Ill., a corporation of Ohio Application December 24, 1951, Serial No. 263,127

9 Claims. (Cl. 252—8.55)

This invention relates to a method for chemically treating a siliceous geological formation to increase its permeability to fluids. It specifically is concerned with a method for preventing the precipitation of certain water insoluble materials during the treating of subterranean siliceous formations with hydrogen fluoride-containing treating reagents selected from the group consisting of hydrogen fluoride and fluophosphoric acids.

The treatment of geological formations by leaching the respective constituents susceptible to treatment with a chemical reagent to enlarge the formation interstices has long been employed in assisting the production of indigenous fluids from subterranean deposits. Concurrent with the development and improvement of these practices there arose the problem of avoiding the clogging of the interstices during the treatment of the rock strata which was due to the formation and precipitation of hydrous and gelatinous reaction products resulting from the interaction of the treating solution and the rock strata or formation water contained therein. These precipitates counteract the effect of the chemical treatment and reduce the permeability of the formation to such an extent that fluid passage through the formation is deleteriously affected. Accordingly, water and oil insoluble precipitates resulting from the treating of geological formations are well recognized disadvantages which arise in the acidizing of subterranean geological formations. In the acidizing of calcareous formations with hydrochloric acid gelatinous precipitates of aluminum or iron hydrate as well as insoluble calcium sulfate anhydrite provide precipitates which result in a decrease of the permeability of the formation being treated if allowed to remain within the formation interstices. Similar difficulties may occur when siliceous geological formations are chemically treated to increase their permeability. These formations may contain calcium salts, such as gypsum, calcium carbonate and calcium silicate, as part of the rock strata and/or brinish formation waters containing inter alia, the chlorides of calcium, magnesium, and sodium within the strata interstices. While precipitates of magnesium salts are not encountered due to the low concentration of magnesium generally present in formation brines and the acidic environment present during acidizing operations, the presence of calcium and sodium does produce undesirable precipitates.

Although other chemical reagents are available for dissolving silica-containing geological formations by means of chemical reaction therewith, hydrogen fluoride-containing solutions selected from the group consisting of hydrogen fluoride and fluophosphoric acids are generally selected because of their effectiveness. When these solutions are employed the hydrogen fluoride may react with formation constituents other than silica to form insoluble precipitates such as calcium fluoride. Also, the reaction effluent resulting from the treating procedure will contain products such as fluosilicic acid capable of reacting further with the formation constituents to produce undesirable hydrous and gelatinous precipitates. The formation of plugging precipitates and their prevention is the subject matter of the Morgan United States Patent 2,128,161 as well as United States Patents 2,225,695 to Henderson et al. and 2,425,415 to Bond et al. Morgan proposes the use of calcium sequestering agents for preventing the formation of insoluble calcium salts which form during the treating of a calcareous earth formation with an acidizing reagent. Materials containing or producing the metaphosphate ion, such as sodium hexa metaphosphate, are described as suitable calcium sequestering agents. Henderson, et al. describe a method for increasing the fluid production of siliceous formations wherein the producing strata is first treated with a silica leaching reagent, such as hydrogen fluoride, and thereafter is treated with a reagent which will dissolve the reaction products which form the undesirable precipitants. Hydrogen chloride is shown to be a chemical reagent which is capable of dissolving the undesirable reaction products that form during the interaction between the producing formation and the silica dissolving reagent. In a two-stage treatment, Bond, et al. subject siliceous formations containing calcium and magnesium salts to the action of a boric acid-containing fluoboric acid solution followed by a hydrofluoric acid-containing fluoboric acid treating solution. By employing this two-stage process calcium and magnesium compounds are dissolved and removed without forming undesirable precipitates which would otherwise obstruct the passageways in the geological formation.

These foregoing prior art methods have certain disadvantages. For example, sodium hexa metaphosphate will not function to prevent the formation of calcium fluoride in all types of acidic environments although it is described by Morgan as a calcium sequestering agent. The use of hydrogen chloride as a reagent capable of dissolving the reaction products formed during the treatment of the rock strata requires a two-step process and in some instances the formation conditions may not permit the reaction product-dissolving reagent to contact the undesirable precipitants to effectuate their removal. And finally, the use of boric acid as a means for preventing the formation of water insoluble calcium and magnesium salts may adversely affect the reactivity of the treating reagent towards silica when used in concentrations sufficient to prevent precipitation. In fact it has been found that if sufficient boric acid is added to a difluophosphoric acid treating solution to prevent precipitation of calcium salts, the boric acid-containing treating solution will not dissolve silica.

Figure 2:
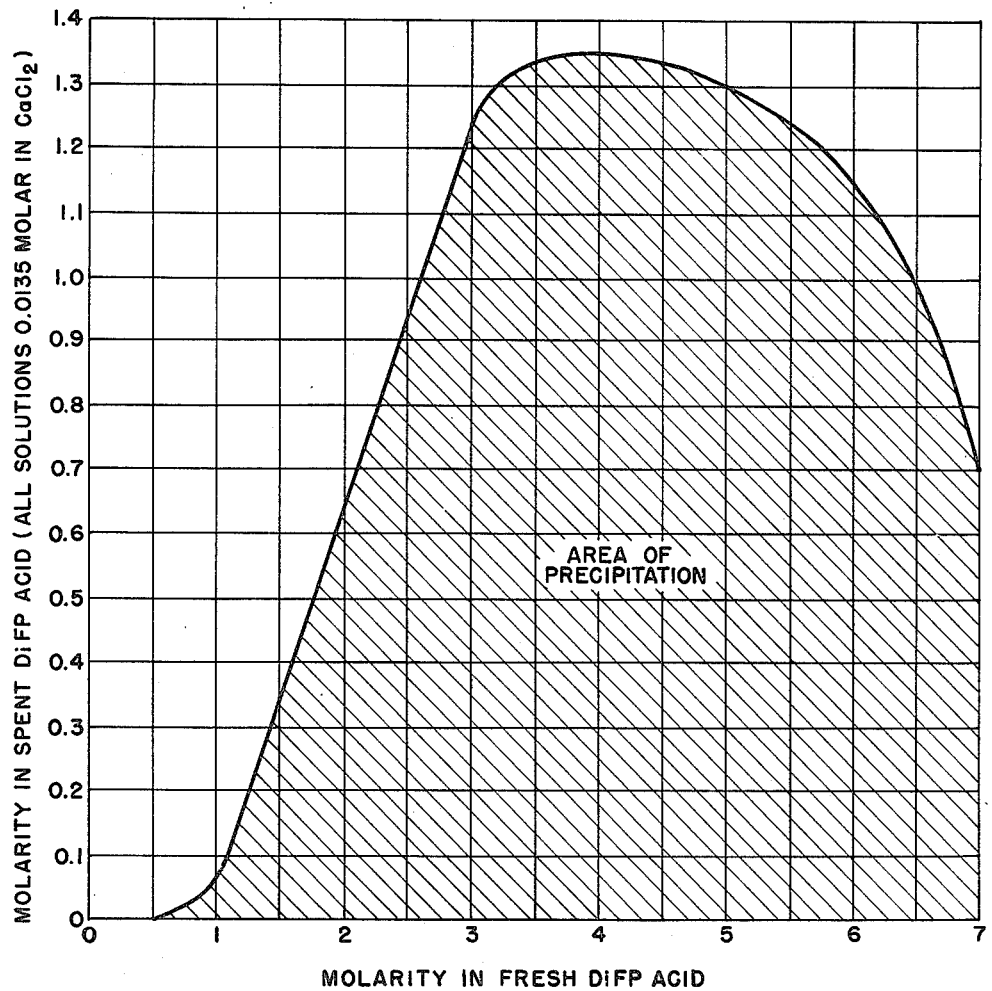

It is therefore the object of this invention to provide a method for preventing the precipitation of water and/or oil insoluble calcium salts during the treatment of siliceous geological formations with aqueous solutions of hydrofluoric acid or a fluophosphoric acid to avoid clogging the formation interstices without unduly retarding the treating operation. This and other objects of our invention will become apparent from the following description of this invention:

In the accompanying drawings, Figure 1 is a graphical presentation showing the effect of modifying a geological formation treating solution to prevent the formation of calcium fluoride precipitates. Figure 2 illustrates the amounts of precipitation inhibitor required to eliminate the precipitation of calcium fluoride for a given concentration of calcium salts.

In accordance with our invention it has been found that, if the acidizing of siliceous formations containing calcium salts within the formation or in brinish formation waters present therein is carried out in the presence of sufficient amounts of fluosilicic acid, the precipitation of calcium salts such as calcium fluoride, calcium phosphate or calcium silicate is prevented. In carrying out this invention hydrogen fluoride-containing treating solutions such as hydrofluoric acid, or acids which hydrolyze to produce hydrogen fluoride such as fluophosphoric acid are employed as the acidizing medium. The prior art expedients whereby hydrogen fluoride is formed in situ by reacting a mineral acid and an inorganic fluoride should not be used as a source of treating agent in effectuating this invention inasmuch as it has been found that the use of this method results in decreasing the permeability of the formation being treated. While this invention is directed to the use of hydrogen fluoride as an acidizing reagent caution should be observed in using hydrogen fluoride in this manner because as a result of the interaction of hydrogen fluoride with the siliceous strata, silicic acid, a gelatinous precipitate may be formed which may clog the formation interstices. The use of an acidizing medium which will hydrolyze to produce hydrogen fluoride will preclude the precipitation of silicic acid. Accordingly, fluophosphoric acids are preferred as the acidizing reagent in carrying out the instant invention, the use of fluophosphoric acids as acidizing reagents for siliceous formations is more fully described in U. S. Patent 2,664,398. The calcium salt precipitant inhibitor may be either fluosilicic acid per se the fluosilicic acid-containing spent treating solutions which result from treating the aforementioned siliceous formations with a hydrogen fluoride-containing treating reagent. The use of these latter solutions which are hereinafter referred to as spent acid is economically desirable and also advantageous when a series of wells in close proximity is being treated because the spent acid produced during one well treating operation may be utilized in subsequent treating operations as the calcium salt precipitate inhibitor.

In order to illustrate the instant invention the precipitation occurring in mixtures of a hydrogen fluoride-containing solution suitable for treating siliceous formations was investigated by visually observing the formation of precipitates occurring during the admixture of the hydrogen fluoride-containing solution with calcium chloride solutions. In this procedure the formation of precipitates was observed visually by mixing in a suitable vessel the acid and salt solutions. Data thus obtained are shown in Table I.

TABLE I

*Effect of admixing aqueous salt solutions with either fresh 50% fluophosphoric or spent 50% fluophosphoric acid*

| Salt Solution, Weight Percent | | Effect of Admixture — Volume Ratio: Salt Solution / Acid Solution | | | | | |
|---|---|---|---|---|---|---|---|
| | | Fresh 50% Di FP Acid | | | Spent 50% Di FP Acid | | |
| NaCl | CaCl₂ | 1:9 | 1:1 | 9:1 | 1:9 | 1:1 | 9:1 |
| 0.9 | 0 | | | | No ppt | No ppt | No ppt |
| 1.8 | 0 | | | | Slight ppt | Slight ppt | Slight ppt |
| 3.5 | 0 | | | | ppt | ppt | ppt |
| 7.0 | 0 | No ppt | No ppt | No ppt | ppt | ppt | ppt |
| 26.5 (satd.) | 0 | do | do | do | large ppt | large ppt | large ppt |
| 0 | 0.03 | Slight turbidity | Slight turbidity | Slight turbidity | | | |
| 0 | 0.06 | Slight ppt | do | do | | | |
| 0 | 0.13 | do | Slight ppt | do | | | |
| 0 | 0.25 | ppt | ppt | ppt | | | |
| 0 | 0.5 | ppt | ppt | ppt | | | |
| 0 | 1.0 | ppt | ppt | ppt | | | |
| 0 | 2.0 | ppt | ppt | ppt | No ppt | No ppt | No ppt |

From this table it is seen that undesirable precipitation occurs when an aqueous solution of a fresh fluophosphoric acid is added to a salt solution containing calcium chloride. Under the conditions shown in Table I the ratio of salt solution to acid solution does not affect the formation of precipitates. In other words, because of the insolubility of the calcium salts formed, within practical limits, it is difficult to preclude precipitation by trying to maintain in the system enough solvent to redissolve the insoluble calcium salts present. It is also interesting to note that when a spent fluophosphoric acid was used in preparing the calcium-containing mixtures no precipitate was formed indicating that calcium fluosilicate does not precipitate under these conditions whereas admixtures of spent fluophosphoric acid and sodium chloride solution produced precipitation. The above table also shows that sodium salts formed when a fresh fluophosphoric acid is commingled with a sodium chloride solution are soluble and cause no problem. Although theoretically fresh fluophosphoric acids hydrolyze to produce hydrogen fluoride and phosphoric acid, calcium phosphate will not form because the acidic environment present during acidizing prevents its formation. In carrying out these tests the calcium chloride solutions were limited to concentrations of 2% or less. A 2% calcium chloride solution represents a concentration of 20,000 p. p. m. While this does not represent the extreme limit of calcium content of brinish formation waters, it is representative of typical oil field brines and higher concentrations will be encountered infrequently. In this regard reference is made to the composition of representative oil field brines tabulated by M. Muskat in Physical Principals of Oil Production, McGraw-Hill, 1949, at page 106.

In Table II data obtained in the same manner as reported in Table I illustrate the potential plugging effect which would result from the calcium precipitate formed when a 10% hydrogen fluoride solution was admixed with a 0.5% calcium chloride solution containing varying amounts of sodium hexametaphosphate. From these results it is seen that although the calcium sequestering agents suggested by Morgan in United States Patent 2,128,161 are presumably operative when used in acidizing calcareous formations to prevent the formation of calcium sulfate, they will not function uniformly to prevent the precipitation of calcium salts such as calcium fluoride in all types of acidic environments.

TABLE II

*Potential plugging effect of precipitate ($CaF_2$) formed on mixing 10% solution of hydrogen fluoride treating solution with 0.5% $CaCl_2$ solution containing varying amounts of sodium hexametaphosphate*

| No. | Composition of Salt Solution | | Composition of Treating Solution | Ratio of Salt Solution to Treating Solution | Result of Mixing Salt and Acid Solutions |
|---|---|---|---|---|---|
| | Percent $Na_6P_6O_{18}$ | Percent $CaCl_2$ | | | |
| 1 | 0 | 0.5 | 10% HF | 1:1 | Fine ppt. |
| 2 | 0.02 | 0.5 | 10% HF | 1:1 | Do. |
| 3 | 0.04 | 0.5 | 10% HF | 1:1 | Do. |
| 4 | 0.08 | 0.5 | 10% HF | 1:1 | Do. |

In an elaboration of this visual observation technique a more definitive indication of the amounts of precipitates formed by the reaction between a hydrogen fluoride-containing treating solution and a calcium salt solution and the inhibition of calcium fluoride precipitation due to the presence of fluosilicic acid is demonstrated by comparing therewith a set of standards consisting of a series of six suspensions of bentonite in water. These standard suspensions contain 0.5, 0.2, 0.1, 0.06, 0.02 and 0.005% by weight of bentonite. The measure of precipitation so obtained is reported as "units of equivalent per cent by weight of bentonite." This comparative study is carried out in a manner similar to that method used for the measurement of turbidity of water, Standard Methods for Examination of Water and Sewage, 8th ed., American Public Health Association. Table III summarizes in tabular form the effect of fluosilicic acid-containing solutions on the precipitation resulting from the commingling of fluophosphoric acid and calcium chloride.

TABLE III

*Effect of spent fluophosphoric acid on precipitation in fresh fluophosphoric acid—$CaCl_2$ mixtures*

| Run No. | Molar Concentration of Mixtures | | | Precipitation (Equivalent Percent Bentonite) |
|---|---|---|---|---|
| | $CaCl_2$ | Fresh Di FP Acid | Spent Di FP Acid | |
| 1 | 0.0068 | 1.0 | 0 | 0 |
| 2 | 0.0135 | | 0 | 0.02 |
| 3 | | | 0.03 | 0.01 |
| 4 | | | 0.16 | 0 |
| 5 | | | 0.33 | 0 |
| 6 | | | 0.67 | 0 |
| 7 | | | 1.0 | 0 |
| 8 | | 2.0 | 0 | 0.02 |
| 9 | | | 0.33 | 0.01 |
| 10 | | | 0.67 | 0 |
| 11 | | 3.5 | 0 | 0.02 |
| 12 | | | 1.0 | 0.005 |
| 13 | | | 1.33 | 0 |
| 14 | | 4.5 | 0 | 0.01 |
| 15 | | | 0.67 | 0.005 |
| 16 | | | 1.33 | 0 |
| 17 | | 7 | 0 | 0.02 |
| 18 | | | 0.18 | 0.01 |
| 19 | | | 0.36 | 0.01 |
| 20 | | | 0.7 | 0 |
| 21 | | | 1 | 0 |
| 22 | | | 1.33 | 0 |
| 23 | 0.0203 | 1 | 0 | 0.06 |
| 24 | | | 0.03 | 0.06 |
| 25 | | | 0.16 | 0.004 |
| 26 | | | 0.33 | 0 |
| 27 | | | 0.67 | 0 |
| 28 | | | 1 | 0 |
| 29 | | | 1.33 | 0 |
| 30 | 0.0270 | | 0 | 0.25 |
| 31 | | | 1 | 0.06 |
| 32 | | | 2 | 0.02 |
| 33 | | | 2.7 | 0.01 |
| 34 | | | 3.7 | 0.01 |
| 35 | | | 4.7 | 0.01 |

The data, runs No. 1 through 22, inclusive are also shown graphically in Figure 1 where precipitation is correlated with the molarity of the mixtures of the fluosilicic acid containing precipitation inhibitors. It will be noted that a linear relationship is obtained in which all of the lines intersect the abscissa of the graph at zero precipitation. By plotting these intercepts of zero precipitation the curve shown in Figure 2 was obtained. This graphical presentation relates the concentration of fluophosphoric acid with the concentration of fluosilicic acid-containing solution which will substantially prevent the precipitation of calcium fluoride in mixtures of fluophosphoric acid and calcium chloride. Runs 23 through 35 show the effect of increasing the concentration of the calcium chloride solution. Even when the concentration of calcium is excessive (runs 30 to 35 inclusive) the precipitation is reduced to an amount which should not have the harmful effect on the permeability of the formation undergoing acidizing.

In interpreting the results shown in Table III it must be borne in mind that there is no direct correlation between the turbidity equivalent and decrease in permeability resulting from the degree of precipitation indicated by the turbidity equivalent. The clogging of a formation will depend upon at least four important factors:

(1) Amount of connate water present in the formation,
(2) Concentrations of salts in the connate water present,
(3) Porosity of the formation, and
(4) Permeability of the formation.

The data presented in Table III is indicative that for certain concentrations of calcium salts precipitation can be completely eliminated. At higher concentrations precipitation is no longer prevented. However, it may be mitigated to such an extent that the objects of this invention can be successfully effectuated. This data should not be construed to impose operational limitations on the instant invention.

From the foregoing it is seen that fluosilicic acid-containing solutions if used in sufficient amounts will substantially prevent the precipitation of insoluble calcium salts. Although it is not intended that the instant invention be limited by any postulations, it is thought that the ability of fluosilicic acid to inhibit the precipitation of water and/or oil insoluble salts may be caused by the reaction between fluosilicic acid and the fluoride ion. This is evidenced by the fact that the presence of fluosilicic acid decreases the activity of fresh fluophosphoric acid towards silica to a certain extent. Apparently the fluosilicic acid ties up the hydrogen fluoride constituent of the treating solution so that it is not capable of reacting with the calcium ion or with silica. The extent of retardation due to the use of fluosilicic acid is not as severe as that encountered when boric acid is employed as a precipitation inhibitor. Furthermore this slight decrease in reactivity is used to advantage in that no local action occurs at the face of the formation. This permits the treating solution to penetrate the formation to points remote from the bore hole thus permitting a more extensive acidizing treatment.

In carrying out this invention the treatment of two different types of siliceous formations must be considered: first, siliceous formations free from brinish formation waters but containing calcium constituents such as calcium carbonate, and second, siliceous formations which may or may not contain calcium constituents but which do contain brinish formation waters. Where the siliceous formation does not contain formation waters but merely contains calcium-containing constituents which would result in the formation of water and/or oil insoluble calcium precipitates, the fluosilicic acid may be initially introduced onto the formation thereafter followed by the hydrogen fluoride-containing treating solution. As an alternative the fluosilicic acid-containing solution may be admixed with the acidizing solution and the resulting admixture introduced into the formation. If hydrogen fluoride is used as the treating reagent these solutions may be injected into the siliceous formation undergoing treatment in the same manner as that described in the Carr United States Patent 1,891,667 or 2,018,199. However when employing a fluophosphoric acid treating solution it is preferred that the solution be prepared in the well bore by separately introducing the solution constituents into the well bore and effecting their admixture in the vicinity of the formation to be treated. Accordingly, conventional methods of acidizing will have to be modified to enable this expedient to be carried out. In carrying out the instant invention a Berea sand formation having the following analysis: 95% $SiO_2$, 3% Ca (as $CaCO_3$), 2% $Fe_2O_3$ found in the Cabin Creek field, may be treated with a mixture of 2500 gallons of 50% difluophosphoric acid solution and 1250 gallons of spent difluophosphoric acid solution obtained by treating a siliceous formation with a 50% solution of difluophosphoric acid and recovering the spent acidizing solution.

It is evident that the quantity of hydrogen fluoride-containing treating solutions which is applied to the formation to effectuate an increase in the permeability will depend upon the size and extent of the formation being treated. Similarly the fluosilicic acid-containing solution may be introduced in various quantities depending upon the calcium content of the particular formation and the quantity of hydrogen fluoride-containing acidizing solution employed. For example, where the quantity of hydrogen fluoride-containing solution applied to a well varies from 500 to 5000 gallons or more, the quantity of fluosilicic acid may vary from 100 to 2500 gallons. The concentration of the treating solutions may also vary when using hydrogen fluoride solutions containing between 5 and 50% by weight of hydrogen fluoride. Fluophosphoric acid solutions should have a concentration of about 40 to 60% by weight of fluophosphoric acid. This method of treating calcium-containing siliceous formations is advantageous where the calcium content is not more than 10 to 20%. If the formation to be acidized contains an appreciable amount of calcium carbonate, hydrochloric acid should be injected ahead of the hydrogen fluoride-containing solution, in order to remove the calcium carbonate. This will have the effect of saving the more expensive hydrogen fluoride-containing solution for reacting on silica and will also lessen the chance of precipitating calcium fluoride. The amount of hydrochloric acid to be used should be somewhat greater than the stoichiometric amount required to react with all of the calcium carbonate on the volume of rock that will be filled by the subsequent hydrogen fluoride-containing solution treat. Where calcium is present in greater amounts other treating reagents such as hydrochloric acid or hot caustic alkali solutions would be more preferable.

In treating siliceous formations which contain brinish formation waters an additional precaution must be taken in order to preclude the precipitation of undesirable materials. It is well known that the brine encountered in geological formations will contain sodium as well as calcium salts. Therefore, it is necessary when treating brine-containing siliceous formations with hydrogen fluoride-containing solutions that the precipitation of sodium fluosilicate be prevented. Although the concentration of sodium in brines is generally greater than the concentration of calcium, fortunately the solubility of sodium fluosilicate is much greater than the solubility of the calcium fluoride formed when the acid treating solution is initially introduced into the formation. Therefore the possibility of the formation of sodium fluosilicate precipitates is less than that of calcium fluoride. If necessary, sodium fluosilicate precipitation can be prevented by introducing fresh water or acidified water having a pH of about 1 to 3 as an initial step in the treatment of brine-containing siliceous formations to avoid precipitation of sodium fluosilicate. This expedient is described and claimed in U. S. patent application, Serial No. 263,128, filed December 4, 1951. As illustrative of a procedure which may be employed in treating a siliceous formation containing formation water, such a formation may be initially treated by forcing into the formation 10,000 gallons of fresh water. This is followed by 5000 gallons of a solution comprising 3750 gallons of 50% difluophosphoric acid and 1250 gallons of spent 50% difluophosphoric acid. Again as in the treatment of water-free siliceous formations outlined above, the amounts of the various treating materials will depend upon a number of factors such as composition of the formation water, composition of the treating solution, formation temperature, etc. However the manipulative procedure of introducing the various solutions into the formation can be effectuated in the same manner as outlined above.

It is therefore seen that the precipitation of oil and/or water insoluble calcium salts may be substantially prevented in the treatment of siliceous formations with hydrofluoric acid-containing solutions by carrying out the treatment in the presence of fluosilicic acid-containing solution. The calcium salt precipitation inhibitor may be initially introduced into the formation and thereafter the acidizing reagent injected into the formation or a mixture of precipitation inhibitor and acidizing reagent may be employed.

In the appended claims the expression calcium-containing is intended to connote the conditions wherein calcium salts are present integrally within the siliceous formation and/or are present in the brinish formation waters contained in the interstices of the siliceous formation.

What is claimed is:

1. In the acid treatment of calcium-containing siliceous geological formations with hydrofluoric acid-containing treating solutions selected from the group consisting of hydrogen fluoride and fluophosphoric acids to increase the permeability of said formation, said acid treatment resulting in the formation of fluosilicic acid, a step for substantially preventing the precipitation of oil and water insoluble calcium salts during said acid treatment, which consists essentially of introducing into said formations added amounts of fluosilicic acid, said fluosilicic acid being present in an amount sufficient to prevent substantially the precipitation of calcium fluoride.

2. A method in accordance with claim 1 in which the fluosilicic acid is spent acid prepared by reacting a fluophosphoric acid with silica.

3. A method in accordance with claim 2 in which the fluophosphoric acid is mono fluophosphoric acid.

4. A method in accordance with claim 2 in which the fluophosphoric acid is di fluophosphoric acid.

5. A method in accordance with claim 2 in which the fluophosphoric acid is hexa fluorphosphoric acid.

6. A method in accordance with claim 1 in which the fluosilicic acid is spent acid prepared by reacting hydrofluoric acid with silica.

7. In the acid treatment of calcium-containing siliceous geological formations with hydrofluoric acid-containing treating solutions selected from the group consisting of hydrogen fluoride and fluophosphoric acids to increase the permeability of said formation, said acid treatment resulting in the formation of fluosilicic acid, a step for substantially preventing the precipitation of oil and water insoluble calcium salts during said acid treatment, which consists essentially of introducing into said formation added amounts of fluosilicic acid obtained by treating siliceous formations with hydrofluoric acid-containing solutions selected from the group consisting of hydrofluoric acid and fluophosphoric acids.

8. In the acid treatment of calcium-containing siliceous geological formations with hydrofluoric acid-containing solutions selected from the group consisting of hydrogen fluoride and fluophosphoric acids to increase the permeability of said formation, the method of substantially preventing the precipitation of oil and water insoluble calcium salts which comprises injecting into said formation a fluosilicic acid-containing solution and subsequently injecting into said formation said hydrofluoric acid-containing treating solution in an amount sufficient to increase the permeability of said formation, said fluosilicic acid being present in an amount sufficient to prevent substantially the precipitation of calcium fluoride.

9. In the acid treatment of calcium-containing siliceous geological formations with hydrofluoric acid-containing solutions selected from the group consisting of hydrogen fluoride and fluophosphoric acids to increase the permeability of said formation, the method of substantially preventing the precipitation of oil and water insoluble calcium salts which comprises admixing fluosilicic acid-containing solutions with said hydrofluoric acid-containing solutions and thereafter forcing the resulting admixture into said formation, said hydrofluoric acid-containing treating solution being present in an amount sufficient to increase the permeability of said formation and said fluosilicic acid being present in said admixture in an amount sufficient to prevent substantially the precipitation of calcium fluoride.

References Cited in the file of this patent

UNITED STATES PATENTS

| Number | Name | Date |
|---|---|---|
| 1,990,969 | Wilson | Feb. 12, 1935 |
| 2,200,710 | Bent et al. | May 14, 1940 |
| 2,225,695 | Henderson et al. | Dec. 24, 1940 |
| 2,300,393 | Ayers | Nov. 3, 1942 |
| 2,367,350 | Heigl | Jan. 16, 1945 |